INVENTORS
FRANK D. COVELY, 3RD
& LESTER E. HAINING
BY
ATTORNEY

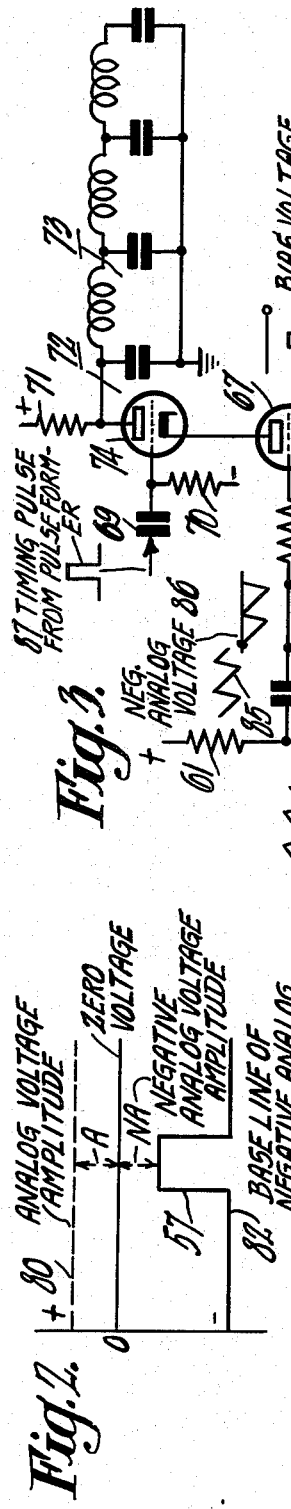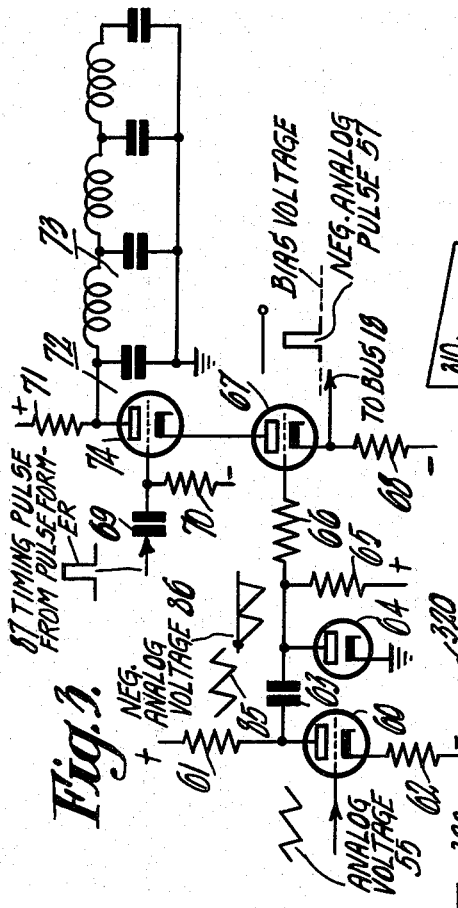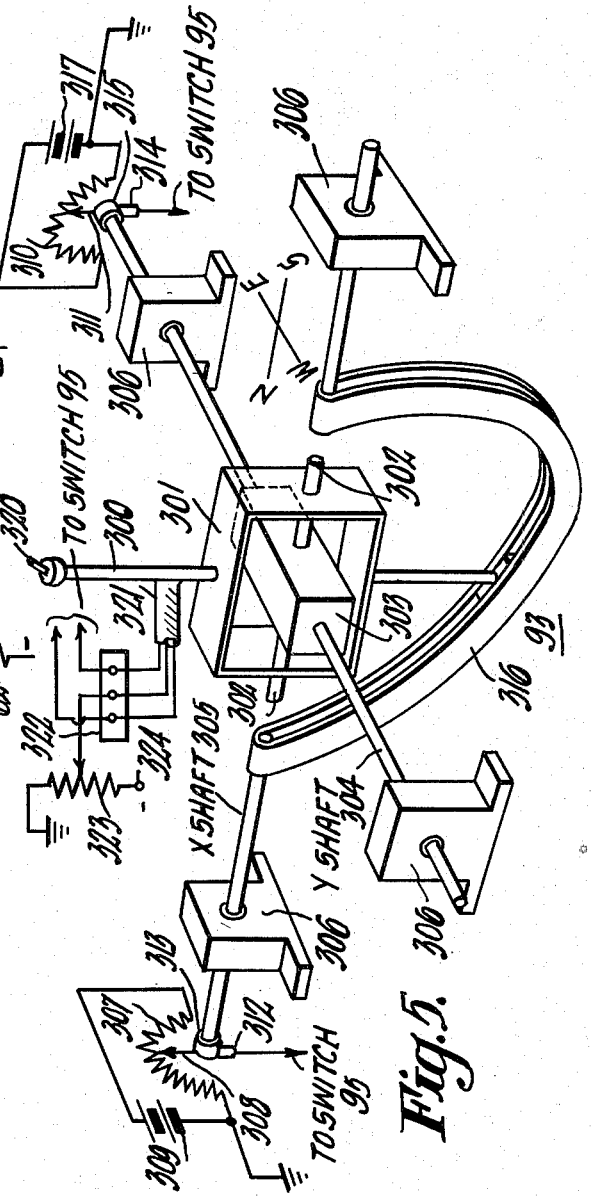

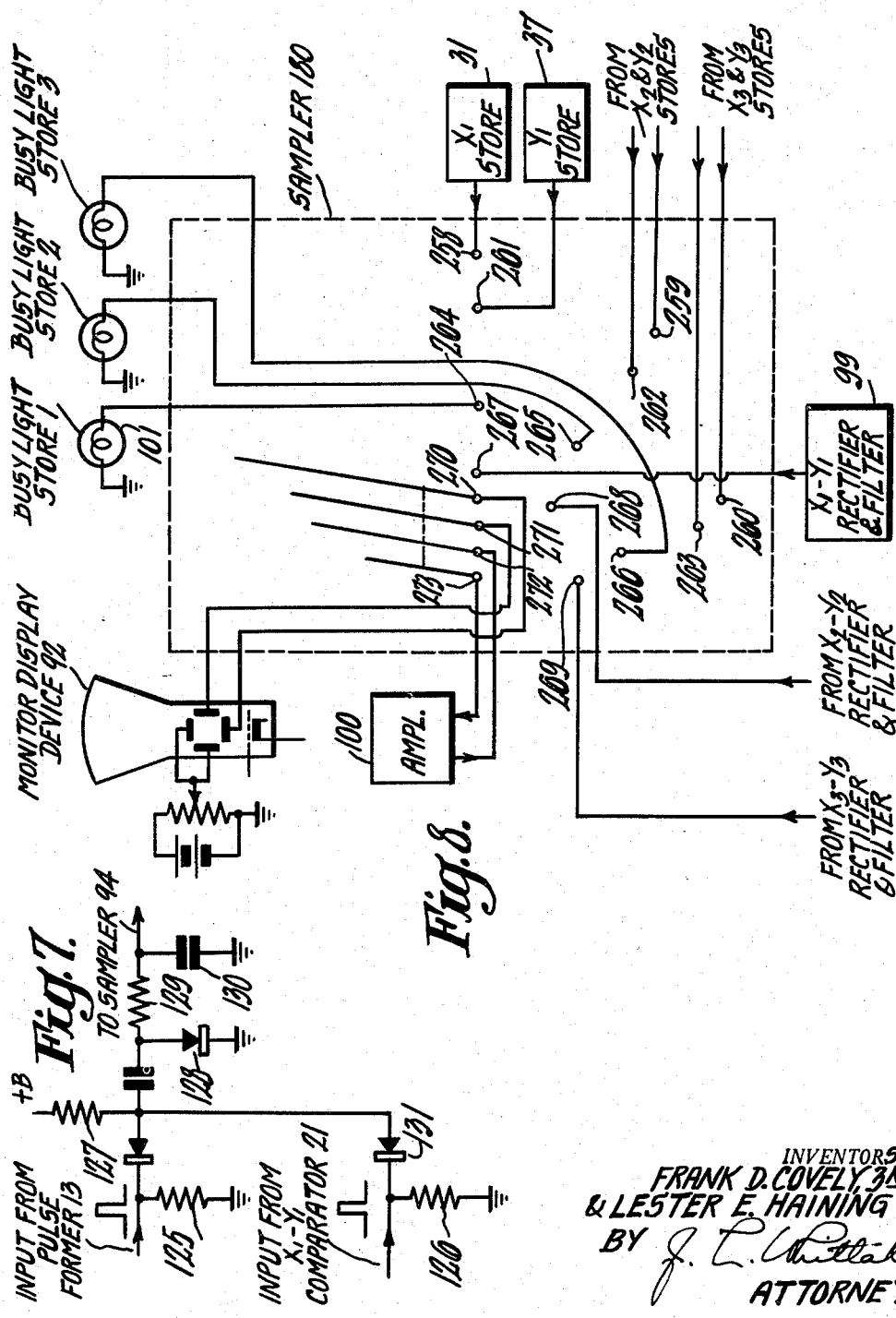

United States Patent Office 2,944,253
Patented July 5, 1960

2,944,253

RADAR SYSTEM AND DISPLAY

Frank D. Covely 3rd, Haddonfield, and Lester E. Haining, Audubon, N.J., assignors to Radio Corporation of America, a corporation of Delaware Filed Dec. 31, 1954, Ser. No. 479,151

27 Claims. (Cl. 343—5)

This invention relates to the designation of target and the initiation of the automatic tracking operation in automatic track-while-scan radar systems.

As the numbers of aircraft using the air lanes has increased, the problem of traffic control at airports has become acute. To aid in the automatic surveillance of traffic at airports, automatic-track-while-scan (ATWS) radar systems have been developed. These systems automatically track, and supply electrical position data with respect to, a plurality of moving targets. ATWS radar systems are also useful in the surveillance of ship traffic in port areas and in the designation of targets to military fire-control systems.

In ATWS radar systems, a plot of the position, with respect to the radar, of targets whose echoes are received by the rotating radar antenna is usually displayed on the screen of a P.P.I. (plan-position-indicator) display tube, and, in addition, analog voltages corresponding to the cartesian coordinates (i.e., the X—Y coordinates) of the positions of selected targets are supplied to sets of storage circuits. In a typical system, one set of stores is associated with each selected target, and one X-storage circuit and one Y-storage circuit comprise one set. The stored analog voltages may be used for various purposes, such as automatic orientation of anti-aircraft artillery, synthetic display of one or more targets, etc.

To maintain the accuracy of such position data, it is essential periodically to correct the stored analog voltages in accordance with changes in the positions of the targets.

This is accomplished once per antenna scan by resolving each received target echo signal into the X- and Y-coordinate analog voltages corresponding to the location of the target. The new coordinate analog voltages of each target are then used to correct the set of stores associated with that particular target. This is done by automatically comparing each new set of coordinate analog voltages with the voltages stored in all sets of X—Y stores, selecting the set of stores whose stored voltage most nearly correspond with the new voltages (normally the same set of stores associated with the target during the previous scan) and altering that set of stored voltages to correspond to the new set of coordinate voltages (new position data). This automatic comparison and correction of the stored data with the new data comprises the automatic tracking feature of ATWS radar systems.

Before the automatic comparison and correction feature can come into operation, however, each set of stored voltages must approximate a set of corresponding analog voltages of a corresponding particular target. In other words, there must be an initial selection for each different target to be tracked of a different set of X—Y stores, and the set of analog voltages corresponding to each different target must then be inserted in the store previously selected for that target.

This invention provides a comparatively simple means for initiating the automatic tracking process of an ATWS radar.

An object of this invention is to provide in an ATWS radar improved and simplified means for selecting a set of stores to be associated with a particular target.

Another object of this invention is to provide in an ATWS radar improved and simplified means for inserting in the target stores the preliminary target data required to initiate the automatic tracking operation.

Yet another object of this invention is to provide an improved indicating system which affords a composite display of the indications from a pair of display devices, in which composite display corresponding indications from each display device are superimposed and in which the superimposed indications and the non-superimposed indications are readily distinguishable from each other.

A further object of this invention is to provide an operator with a quick and simple means for determining which targets on a radar display tube are being automatically tracked by the radar.

The foregoing objects and advantages of the present invention are accomplished by means of a combination of apparatus which permits an ATWS radar operator to ascertain at a glance whether or not targets are being tracked.

The operator watches a superimposed image comprised of the image from a radar display tube, said image being transmitted through a dichroic mirror, and the image from a monitor display tube, said image being reflected from the dichroic mirror. The optical arrangement is such that the screens of the display tubes are perpendicular to each other and the dichroic mirror is located between the two screens at an angle of 45 degrees to each. Since a dichroic mirror transmits light of one color which is different from the color of the light which it reflects, the radar image can readily be distinguished from the monitor image—e.g., the radar indications may be blue and the monitor indications may be red.

When the operator observes a blue indication, he knows that the target it represents is untracked. He then moves the handle, or lever, of a joystick mechanism by means of which direct-current voltages which correspond to the rectangular coordinates of the location of the target can be obtained. The joystick mechanism comprises a lever movably coupled to a pair of orthogonally disposed shafts and capable of rotating the shafts about their longitudinal axes. The shafts are attached to the rotating arms of potentiometers which provide direct-current output voltages proportional to the displacement of the joystick lever.

The direct-current voltages are applied to the deflection plates of the monitor display tube, and produce an indication on its screen which the operator sees as a red indication. He now moves the lever until the red indication (the image reflected by the dichroic glass) coincides with the blue indication (the image transmitted by the dichroic glass) and only a single indication, probably purple, remains. At this time, the direct-current output voltages of the joystick correspond to the coordinates of the position of the target on the radar display tube. These voltages are inserted in a set of store circuits, which set is thereafter associated with that particular target.

Once these voltages have been inserted in the stores, the automatic tracking features of the ATWS radar become operative and the operator can turn his attention to another untracked target.

Thus, the automatic tracking of radar targets is initiated by operation of a joystick mechanism in conjunction with differentiation by means of color differences between the radar target indications and the superimposed monitor indications derived from the joystick mechanism.

The invention will be described in greater detail with reference to the accompanying drawing in which similar reference characters apply to similar elements, and in which:

Figure 2 is a diagrammatic representation of a negative analog pulse;

Figure 3 is a schematic diagram of a circuit which can be employed to provide negative analog pulses;

Figure 5 is a diagram of the joystick mechanism including a schematic of the associated potentiometers;

Figure 7 is a schematic diagram of a coincidence circuit and a rectifier-filter circuit which may be employed in the stores-utilization indicator shown in Figure 6, and Figure 8 is a block and schematic circuit diagram indicating the connections to the four-pole, rotary-switch sampler employed in the embodiment illustrated in Figure 6.

Pulse former

Figure 1:
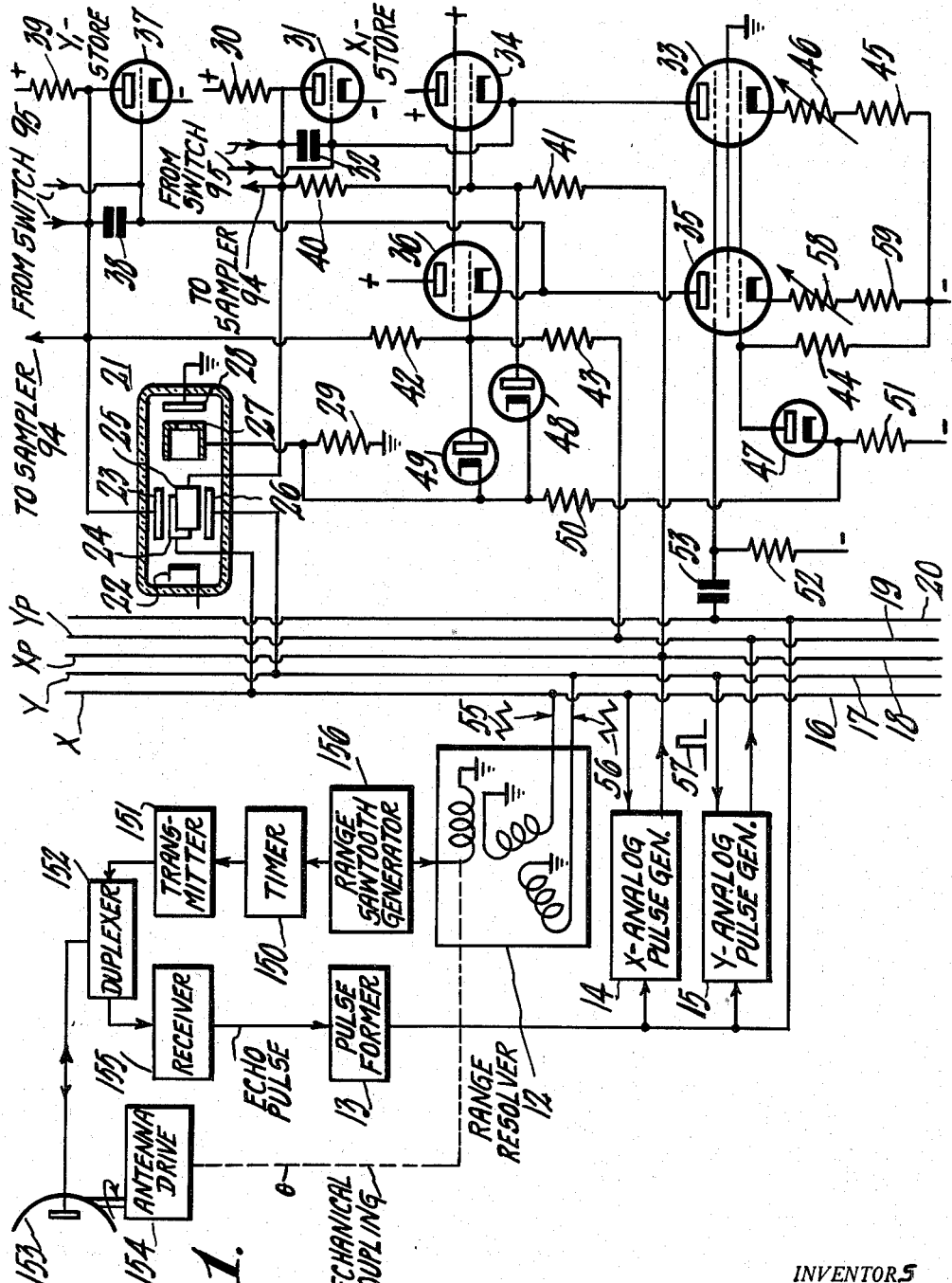
Figure 1 is a block and schematic circuit diagram of a system which will store and correct target position data provided by a radar set.

Referring to Figure 1, a typical embodiment of the invention includes a system for correcting position data obtained by a radar set. The radar equipment may, for example, comprise a pulse-type search radar delivering target range and azimuth data and presenting this data in polar coordinates on a plan-position-indicator (P.P.I.) display scope.

A timer 150, which may be a blocking oscillator or other pulse-generating circuit, delivers trigger pulses to the transmitter 151 which generates high-power pulses of high-frequency electromagnetic energy. These pulses are applied through a duplexer 152, which may be a gas-filled, transmit-receive switch, to the antenna 153, which radiates the energy into space. The antenna is rotated azimuthally by means of the antenna drive mechanism 154, which may be a motor.

If a radiated pulse strikes a target, such as an aircraft, it may be reflected back to the antenna 153. If so, it is impressed upon the duplexer 152, whence it is applied to the receiving circuits 155, where it is amplified and detected.

The echo pulse is then fed into a pulse former 13, which may be a blocking oscillator. The pulse former 13 serves to reform the echo pulse into a pulse having a steeply rising front and a constant amplitude, so that the circuits which are intended to respond to, or be synchronized by, the stimulus of the echo pulse will be actuated in a positive manner which does not vary from pulse to pulse.

Range resolver

The range sweep voltage, or range sawtooth, is a sawtooth voltage supplied to the sweep deflection coil 157 (see Figure 4) of an electromagnetic cathode-ray display tube 90 to sweep the electron beam radially outward from the center of the display tube to its periphery in time synchronism with the radiated pulse. The position of the electron beam at any given instant relative to its center or zero position corresponds to the distance the radiated pulse has travelled from the radar antenna 153. Since the position of the electron beam depends upon the amplitude of the range sawtooth voltage at that instant, the distance, or range, of the radiated pulse (and, therefore, of any target it strikes) can be determined from the amplitude of the range sawtooth at that instant.

The range sawtooth is generated by applying a trigger pulse from the timer 150 to the range sawtooth generator 156, which may be any one of a number of well-known circuits which generate linear sawtooth voltages.

To completely locate the geographical position of the radiated pulse in relation to the radar antenna 153, it is also necessary to take into account the azimuthal position of the radiated pulse, which in turn depends on the angular displacement of the antenna with respect to a fixed azimuthal reference point. Each succeeding radial sweep is slightly displaced from the previous one by rotating the sweep coil 157 in synchronism with the azimuthal rotation of the radar antenna 153. The resultant scan is called a P.P.I. (plan-position-indicator) scan.

The process of completely locating the geographical position of the radiated pulse is accomplished by applying the range sawtooth to a range resolver 12 which separates it into two component sawtooth voltages, for example, an east-west component hereinafter called the X-sawtooth 55, and a north-south component hereinafter called the Y-sawtooth 56. The outputs of the range resolver 12 are synchronous sawtooth voltages 55 and 56, the relative amplitudes of which vary with the angle of rotation of the radar antenna.

Analog pulse generator

Referring still to Figure 1, the X- and Y-sawteeth 55 and 56 are impressed upon the X-bus bar 16 and Y-bus bar 17, respectively, and then coupled to the X-analog pulse generator 14 and Y-analog pulse generator 15, respectively.

An "analog voltage" is defined herein as a voltage whose amplitude represents some other quantity. Thus, at any given instant, the amplitude of the X-sawtooth voltage 55 represents the east-west geographical position of a target reflecting a transmitted pulse with respect to the location of the radar antenna 153, and, therefore, the X-sawtooth voltage 55 is an analog of the east-west geographical position of said target at that instant. The X-sawtooth voltage 55 is hereinafter interchangeably referred to as the X-analog voltage 55.

A "negative analog pulse" is defined herein as a pulse whose amplitude measured from zero voltage is the negative of some analog voltage. Thus, in Figure 2, a negative analog pulse 57 is shown, having an amplitude NA which is the negative of the positive analog voltage 80 indicated by the dotted line, the amplitude of which is indicated by the letter A. It will be noted that, in this particular case, the base line 82 of the pulse 57 does not coincide with the zero voltage level but is even more negative than the amplitude NA of the negative analog pulse 57. This is necessary because the base voltage is used as a bias for tubes 34 and 36 as will be described later.

Continuing with Figure 1, only the parts of the system concerned with operations upon the X-analog voltage, or X-sawtooth, will be described in detail, since the parts concerned with operations upon the Y-analog voltage, or Y-sawtooth, are similar in construction and function.

A circuit for forming such a negative analog pulse is shown in Figure 3. The analog voltage, the X-sawtooth voltage 55 from the X-bus 16, is impressed on the control grid of an electron tube 60 operating as an amplifier with a gain of approximately unity by virtue of the relative proportions of resistors 61 and 62. The waveform 85 on the plate of tube 60 is a negative-going replica of the impressed sawtooth 55. A D.-C. restorer circuit comprising condenser 63, diode 64, and resistor 65 establishes ground potential, or zero volts, as a base voltage from which each negative excursion of the sawtooth originates. This wave 86 is then impressed upon a cathode follower tube 67 which operates without plate voltage most of the time.

The grid current of the cathode follower tube 67 is limited by grid resistor 66, and the cathode is returned through resistor 68 to a negative supply voltage which establishes the base line 82 of the negative analog pulse 57 shown in Figure 2. The pulse itself is formed by applying plate voltage to the cathode follower tube 67 at the proper time, this action being accomplished by means of a delay-line pulse generator stage 72 which is triggered on by pulses 87 from the pulse former 13 (see Figure 1) and is cut-off by the removal of its plate voltage upon termination of the pulse generated by the delay line 73. Thus, the amplitude NA of the negative analog pulse 57 which is obtained across cathode resistor 68 corresponds to the value of the X-sawtooth at the instant an echo pulse is received, and therefore corresponds to the X-component of the geographical location of the radar's target. This negative analog pulse 57 is then impressed upon the $X_p$-bus 18.

The manner in which a pulse is formed by the gas tube 74 and the delay line 73 in conjunction with the timing pulse from the pulse former 13 is explained in Waveforms, vol. 19, Radiation Laboratory Series, pages 239–241.

The X-sawtooth voltage 55 is coupled from the X-bus 16 to the X-analog pulse generator 14, whose output, negative X-analog pulses 57, is impressed upon the $X_p$-bus 18. Thus the value of the X-analog pulse 57, measured from zero, is indicative of the X-position of the target, the echo from which initiated the formation of the X-analog pulse 57.

*Store circuits*

It will be assumed that the radar is in the process of tracking a target and, therefore, that the X storage condenser 32 of a Miller integrator of store circuit 31 has a charge corresponding to a previous X-position of the target. The operation of a Miller integrator circuit is described by B. H. Briggs in the August 1948 issue of Electronic Engineering on pages 243–247. Although other types of storage devices may be employed, utilization of the Miller integrator circuit is preferred. A change in the voltage that is fed to the grid-cathode circuit of the Miller integrator tube results in practically no change in grid voltage but in a large linear change in plate voltage. The voltage on the anode of the Miller integrator tube 31 with respect to the grid, or the charge stored in the condenser 32, is then an analog of the X-component of the position of the radar target, and is impressed upon one of the horizontal plates of the comparator tube 21, while the X-sawtooth 55 is impressed on the other.

*Comparison device (comparator)*

The comparison device, or comparator tube 21, comprises an evacuated electron beam tube including an electron gun with its associated control grid, and accelerating and focusing electrodes, all of which are represented in schematic form in Figure 1 by a cathode 22. The comparator tube 21 also includes two pairs of orthogonal deflecting plates 23, 24, 25, and 26, a cup-shaped collecting electrode 27 having an aperture in its base, and a target electrode 28 located adjacent to the aperture in the collecting electrode (cup) 27. The analog voltages derived from the X- or Y-storage tubes 31 and 37, are applied to deflecting plates 25, 23 respectively in each of the opposed pairs of plates. The other plates 24, 26 in each pair are respectively provided with the sawtooth voltages 55 and 56 on the X-bus 16 and Y-bus 17. In the particular embodiment illustrated in Figure 1, the X-voltages 55 and 56 are coupled to the horizontal pair of deflecting plates 24 and 25, although they may be coupled to the vertical deflecting plates 23 and 26 if so desired.

During the major portion of the antenna's rotation, the amplitudes of the X- and Y-sawteeth voltages 55 and 56 will differ widely from the anode voltages of the Miller integrator tubes 31 and 37. The electron beam from the cathode of the comparator, or gating, tube 21 will, therefore, be deflected, striking the cup 27 and passing to ground through resistor 29 connected thereto. This results in a high negative potential across resistor 29, which potential is transferred freely through diodes 47, 48, and 49 to the control grids of the electron tubes 33, 34, 35, and 36, and biases these tubes far beyond cut-off.

*Variable- and constant-current circuits*

Variable-current tube 34 is a tetrode biased by a combinatiton of two voltages. The first is the voltage across resistor 29, which is the result of the current flow from the negative supply voltage to ground through resistors 51, 50 and 29, and the current flow through resistor 29 alone due to the electron beam from the comparator 21. The second is the voltage tapped off the voltage divider formed by resistors 40 and 41, on the high potential end of which is impressed the voltage from the X-store condenser 32 and on the low potential end of which is impressed the negative potential of the base line of the X-analog pulse.

Constant-current tube 33 whose plate is in series with the cathode of variable-current tube 34, is a pentode also biased by two voltages. The first of these is applied to the control grid and is the voltage across resistors 50 and 29 of the voltage divider comprising resistors 51, 50 and 29. The second is the negative supply voltage and is coupled to the suppressor grid through resistor 52.

The biasing of the variable-current and constant-current tubes 36 and 35 associated with the Y-store 37 is accomplished in a manner similar to that described above for tubes 34 and 33 associated with the X-store 31.

As the radar antenna 153 sweeps toward the area in which the target was previously located, the amplitudes of the X- and Y-sawteeth 55 and 56 approach equality with the amplitudes of the stored voltages of the Miller integrator tubes 31 and 37. The electron beam then experiences very little deflecting potential and passes through the hole in the center of the cup 27 to the grounded target 28. The previous bias across resistor 29, due to the action of the electron beam, disappears, leaving the voltage on resistor 29 only slightly negative. The diodes 48 and 47 then cease to conduct leaving the variable-current tube 34 biased beyond cut-off only by the negative voltage that forms the base of the X-analog pulse 57, and constant-current pentode tube 33 biased beyond cut-off only by the negative voltage coupled to its suppressor grid through resistor 52. At this time, constant-current tube 33 is conducting some screen grid current, but no plate current.

Now, as the radar antenna 153 sweeps across the target, an echo pulse is received. The re-formed echo pulse is coupled to the suppressor grid of constant-current tube 33 and raises it above cut-off. The function of constant-current tube 33 is to conduct a constant, predetermined value of current during the time an echo pulse is being received. The negative bias on its suppressor grid through resistor 52 as reduced by the pulse from bus 20, the negative bias impressed on its control grid by the action of the voltage divider comprising resistors 51, 50, and 29, and the cathode bias generated across resistors 45 and 46 are adjusted so that this predetermined current will be maintained through constant-current tube 33 during the time the echo pulse is being received.

Simultaneously with the impressing of the re-formed echo pulse on the suppressor grid of constant-current tube 33, a negative X-analog pulse 57 is impressed on bus 18 and thence on resistor 41. While these pulses persist, the potential on the control grid of variable-current tube 34 is the result both of the old analog voltage carried in store and the new negative analog voltage on bus 18. Thus, the voltage on the grid of 34 varies in proportion to the difference between the stored and the true analog voltages. This difference is a measure of the correction that must be made.

Thus, when the location of the target remains unchanged, and variable-current tube 34 conducts the same amount of current as constant-current tube 33, no current will flow into the Miller integrator storage circuit, which is effectively in shunt with constant-current tube 33, and there will be no change in the quantity of charge stored in storage condenser 32.

However, if the position of the target has changed since the last sweep of the radar antenna 153, the value of the X-analog pulse 57 will be different from the value of the anode voltage of the Miller integrator tube 31. A net voltage, either positive or negative from its previous value, will now exist at the control grid of variable-current tube 34, causing it to conduct either more or less current than constant-current tube 33. Under these conditions, a current will flow into or out of storage condenser 32, correcting the amount of charge stored in the condenser until it corresponds to the new X-position of the target as indicated by the value of the negative X-analog pulse 57.

The small rheostat 46 in the cathode of the constant-current tube 33 is provided so that the currents flowing through tubes 33 and 34 may be adjusted for equality when the voltage on the grid of tube 34 indicates that no correction is needed.

In the description of the system, the scale of the stored voltage on the anode of the Miller integrator tube 31 was assumed to be equal to the scale of the negative X-analog pulse voltage 57, and resistor 40 was assumed to be equal to resistor 41. These voltage scales may be different, provided that resistors 40 and 41 are properly proportioned and the base value of the negative analog pulse 57 is sufficient to keep variable-current tube 34 biased beyond cut-off between pulses.

The parts of the system concerned with the correction of the Y-analog voltage on the storage condenser 38 are the Miller integrator tube 37, the constant-current tube 35, the variable-current tube 36, and their associated components, all of which correspond respectively to the following X-analog components: the Miller integrator tube 31, the constant-current tube 33, the variable-current tube 34, and their associated components.

It is to be understood, of course, that a position-store circuit, which comprises all of the components to the right of the bus bars in Figure 1, is required for each target which is to be tracked, and that if it is desired to store data with respect to more than one target, additional position-store circuits must be added to the system.

*Target designation mechanism*

As previously explained, once a set of stores contains X- and Y-coordinate analog voltages approximately equal to the incoming X- and Y-analog pulses, recurrent periodic correction of the stores automatically results. The problem is to initially associate a set of stores with a specific target and insert the proper analog voltages corresponding to the position of that specific target.

Figure 4:
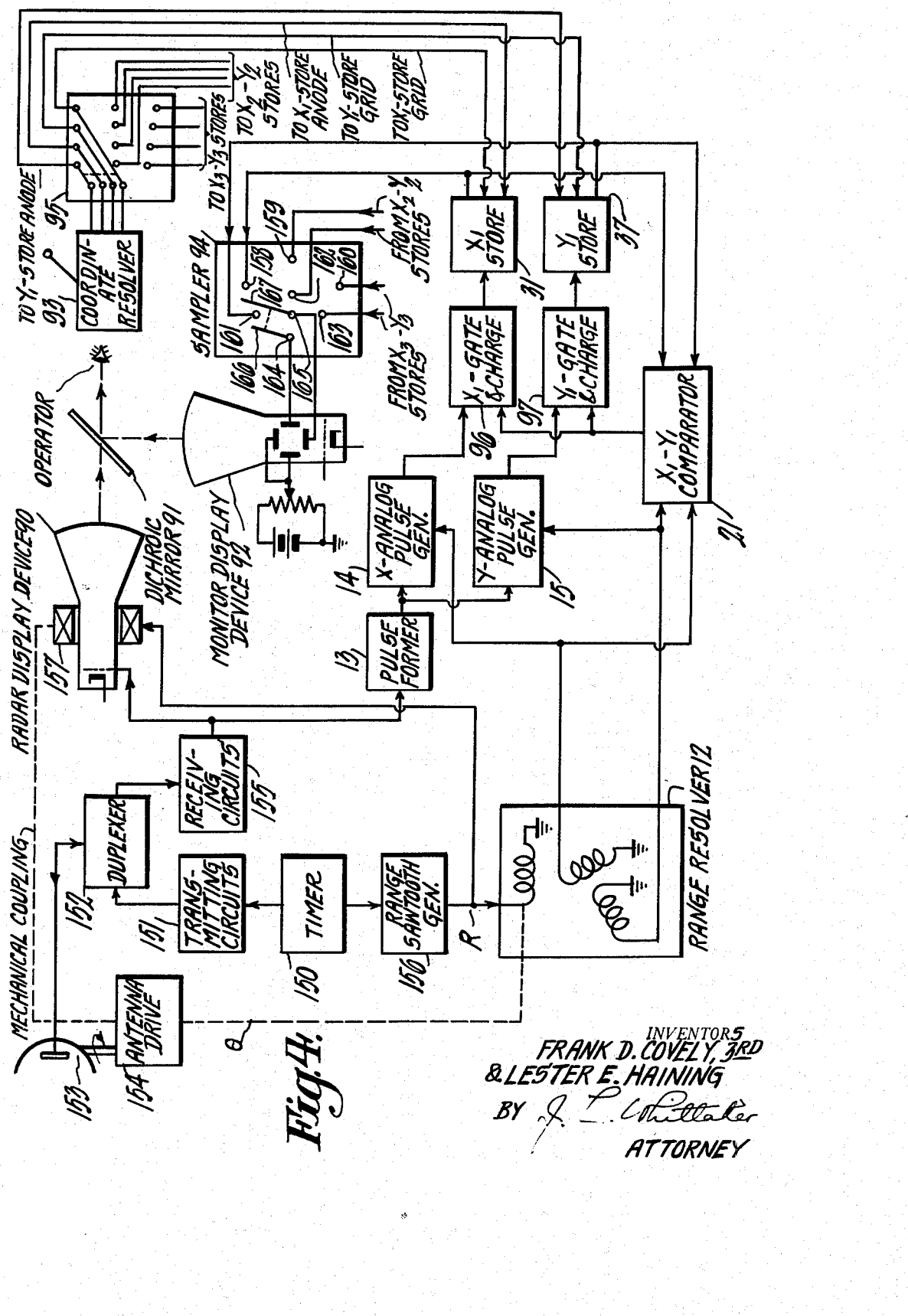
Figure 4 is a block circuit diagram of a system in accordance with this invention which permits an operator to initially select targets to be automatically tracked thereafter by an ATWS radar.

Referring to Figure 4, the outputs of all stores are coupled to the sampler 94. The invention includes a plurality of sets of stores but since they are all substantially identical only a single set, comprising $X_1$-store 31 and $Y_1$-store 37, is illustrated. The sampler 94 may be a high-speed, double-pole, multi-contact, rotary switch, or an electronic switching circuit. If a rotary switch is employed as illustrated all X-stores are coupled to one set of contacts 158, 159, 160, and all Y-stores to the other set of contacts 161, 162, 163 the X- and Y-stores of a single set being, respectively, coupled to identically positioned stations, or contacts, on the poles 164, 165. Although only three sets of contacts are illustrated it is to be understood that there are as many sets of contacts as there are sets of stores.

The X- and Y-coordinate analogs are then coupled sequentially by the rotation of the contact arms 166, 167 of the switch to the X- and Y-deflection plates, respectively, of the monitor display device 92, which may be a cathode-ray display tube. The operating voltages of the monitor display tube 92 are such that the electron beam is operative at all times and forms a spot in the center of the screen of the monitor display tube 92 when zero range analog signals are applied from the X—Y stores, as explained subsequently in connection with the operation of the coordinate resolver 93.

The monitor display tube 92 and the radar display tube 90, on which the detected video output of the receiving circuits 155 is displayed, are arranged at right angles to each other and a dichroic mirror 91 is placed at an angle of 45° with respect to each of the display tubes 90 and 92. A dichroic mirror is a device which partially transmits and partially reflects light that strikes it, the mirror imparting a color to the transmitted light which differs from the color imparted to the reflected light. Thus, some light from the radar display tube 90 is transmitted through the dichroic mirror 91 and some light from the monitor display tube 92 is reflected from the dichroic mirror 91 to the eye of the operator, the optical arrangement of the tubes and mirror being such that target indications on the monitor display tube 92 are superposed upon their counterparts on the radar display tube 90. However, light coming to the eye of the observer from the radar display device 90 has a different color (e.g., blue) than light from the monitor display device 92 (e.g., red).

When the radar antenna 153 first picks up a target, it is displayed only on the radar display tube 90 and appears blue to the observer. If this target were being automatically tracked by the radar, coordinate analog voltages corresponding to its position would be stored in a set of X- and Y-stores and a target indication would appear on the monitor display tube 92. The dichroic mirror 92 imparts a red color to this target indication, but it is superposed upon the blue target indication of the radar display tube 90 and the combination is white to the eye of the observer. Thus, when the observer sees a white indication, he knows that the target is being automatically tracked, but when he sees a blue indication he knows that coordinate analog voltages for the target must be inserted in a set of empty X- and Y-stores.

The observer then moves the joystick handle 300 (see Figure 5) so that a target indication appears on the monitor display tube 92, and continues to move the joystick handle 300 until this target indication, which appears red to him, is superposed upon the original blue target indication. The ATWS radar then tracks the target automatically.

*Coordinate resolver*

The coordinate resolver is a device by means of which direct-current analog voltages corresponding to the rectangular coordinates of the position of any target on the radar display device 90 may be derived. The particular coordinate resolver 93 employed in this embodiment comprises a joystick mechanism which permits two perpendicular shafts to be rotated in either possible direction by moving a single lever attached to both.

Referring to Figure 5, a joystick mechanism which furnishes X- and Y-rectangular coordinate voltages in accordance with the position of the joystick handle 300 is illustrated. The shafts 305 and 304 are supported by four shaft supports 306 mounted on a base (not shown). The joystick handle 300 is separated into two parts by a yoke 301, to which the two parts are affixed. The lower part of the handle 300 rides in a groove between the tracks which form the X-shaft linkage 316. If the orientation of the X-shaft 305 is north-south and that of the Y-shaft 304 is east-west, the lower part of the joystick handle can move in a north or south direction in the groove of the X-shaft linkage 316.

The joystick handle 300 may also be moved in the east-west direction by rotating its yoke 301 around a pair of pivot dowels 302 affixed to the Y-shaft coupling block 303 and extending through the yoke 301. Rotating the handle 300 in the east-west direction rotates the X-shaft 305, to the end of which a slip ring 313 is attached. The contact arm 308 of a potentiometer 307, the output voltage of which is proportional to the angle of deviation of the handle 300 from its vertical position, increasing in positive amplitude as the handle 300 is moved from its extreme westerly position to its extreme easterly position.

Similarly, movement of the handle 100 from south to north rotates the Y-shaft 304 and furnishes an increasing positive voltage from the Y-shaft potentiometer 310. The output voltages are taken from brushes 314 and 312 which contact the slip rings 315 and 313 affixed to the Y- and X-shafts 304 and 305, respectively. The X- and Y-outputs are respectively coupled through a switch 95 to the anodes of the X- and Y-stores of one of the sets of stores (see Figure 1). The switch 95 is a four-pole, multi-position, manually operated switch. In each position there are four contacts: one connected to the anode of an X-store tube; one to the grid of the same tube; one to the anode of the Y-store tube associated with said X-store tube as a set; and one to the grid of the Y-store tube. Each set of four contacts is coupled to a different set of X—Y stores.

Thus, the X- and Y-shafts may be compared to the X- and Y-axes of a rectangular coordinate plot, and the joystick mechanism is a means of resolving the location of the top section of the joystick handle 300 with respect to the axes into X- and Y-coordinate analog voltages.

It may be noted that in the particular type of joystick mechanism indicated in this embodiment the lever can be moved directly to the desired position—thus, if the lever is in a vertical position at the origin of the X—Y coordinate axes, it may, for example, be moved directly along the 45° line bisecting the angle between the X—Y axes, or in any other desired path.

As a consequence of the circuit arrangement and constants of the X- and Y-stores 31 and 37, the stored analog of the X-component of the position of a target ranges from 0 volts for the most westerly position to approximately +100 volts for the most easterly position, with zero range being represented by approximately +50 volts. Similarly, the stored analog of the Y-component of the position of a target ranges from 0 volts for the most southerly position to approximately +100 volts for the most northerly position, with zero range being represented by approximately +50 volts. This necessitates grounding the potentiometers 307 and 310 at the points shown in Fig. 5, so that the outputs from the potentiometers 307 and 310 vary from 0 volts to approximately +100 volts as the joystick handle 300 is moved from its most westerly (or southerly) position to its most easterly (or northerly) position.

Furthermore, in order to establish the zero range position of the electron beam of the monitor display device 92 in the center of its screen, a positive voltage equal to approximately 50 volts must be applied to the pair of deflection plates on which signals from the sampler 94 are not impressed (Fig. 4).

The joystick handle 300 also contains a push button switch 320. This switch 320 has two poles which are coupled to the contact arm of a potentiometer 323. One terminal 324 of this potentiometer 323 is coupled to a source of direct-current voltage more negative than that to which the cathodes of the Miller stores tubes 31 and 37 are coupled. The moving arm of the potentiometer 323 is adjusted so that the voltage tapped off is equal to the grid voltage required to afford zero range output voltage from the stores 31 and 37. The output contacts of the push-button switch 320 are connected by means of flexible leads 321 to a terminal block 322 and thence through the switch 95 to the grid electrodes of the set of X- and Y-stores selected by the switch 95.

The operator selects a set of X- and Y-stores by operating the switch 95. He then depresses the push-button switch 320 and moves the joystick handle 300 to the correct position as previously explained. If any charges have been retained in those stores from a previous use, the voltages now applied to the grids and anodes of the stores correct them to the values now desired. The operator then releases the push-button switch 320 and moves switch 95 to a neutral position. Automatic tracking is then initiated.

It is to be noted that other means, such as a pair of independent potentiometers having their contact arms connected to ordinary knobs, may be employed in place of a joystick mechanism 93. The operator would then use one of his hands to operate one knob and the other hand to operate the other knob.

Busy store-empty store indicator

In order to prevent the insertion of data for a new target in a store that is being utilized to track another target, it is desirable to provide apparatus that will indicate which stores are, and which stores are not, being utilized at the moment.

Figure 6:
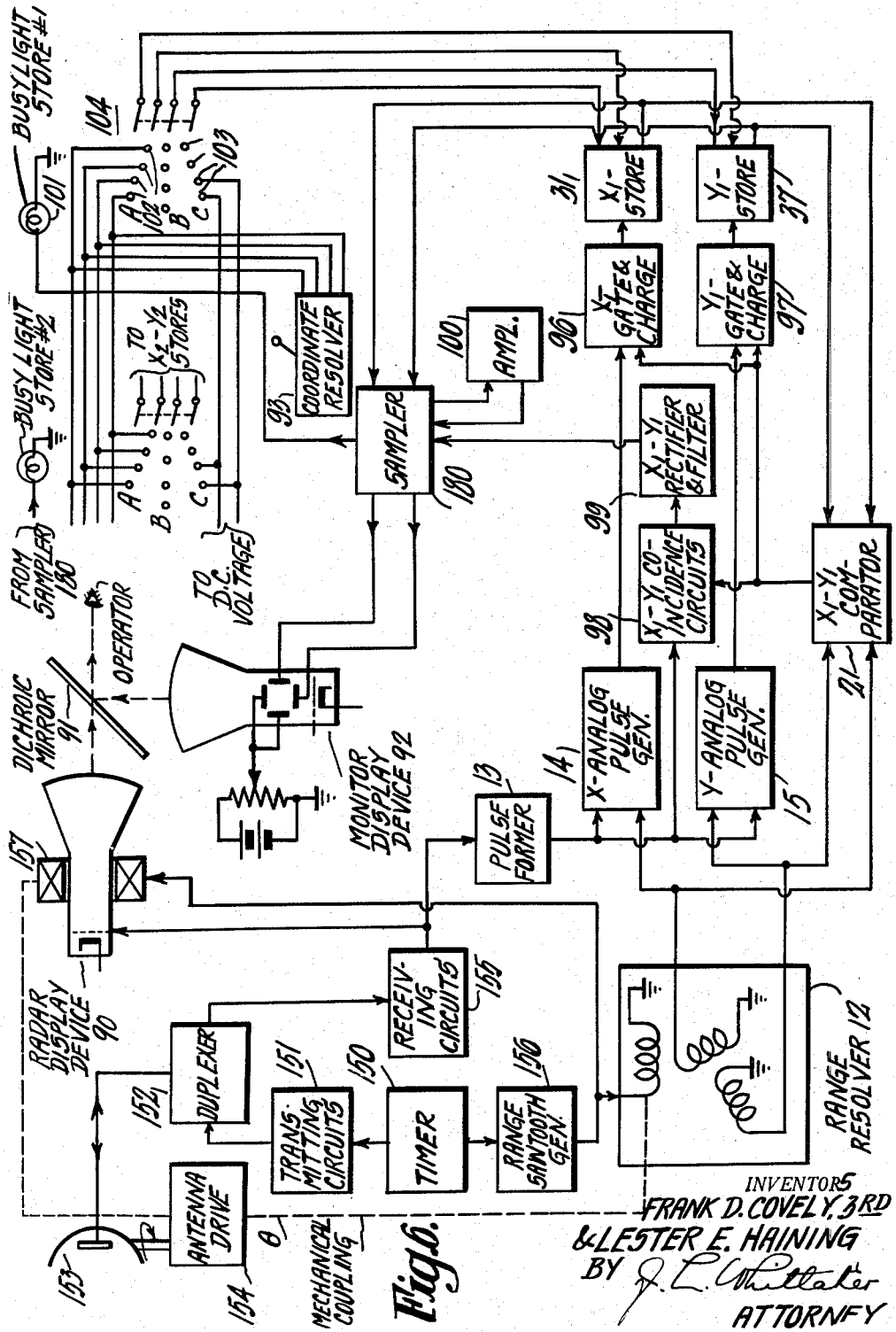
Figure 6 is a block diagram of a system in accordance with this invention in which apparatus is included for indicating which stores are being utilized.

Referring to Figure 6, switching and indicating means are added to the embodiment of this invention illustrated in Figure 4. A coincidence circuit 98 supplies an output whenever a pulse from the pulse former 13 coincides in time with a pulse from the X—Y comparator 21. The coincidence of pulses indicates that echoes are being received from the target whose analog voltages are stored in the X—Y set of stores. The output of the coincidence circuit 98 is then rectified and filtered in the rectifier-filter circuit 99. The output of the rectifier-filter circuit 99 is then impressed upon the proper contact 267 of a third pole 273 of the sampler switch 180 (see Figure 8 for detail of sampler 180) and when contact is made by the moving arm of the sampler switch 180 with the contact 264 corresponding spatially to those of the X—Y stores, the output of the rectifier-filter circuit 99 is applied to an amplifier 100.

The sampler switch 180 is a four-pole, multi-position, high-speed rotary switch similar to the two-pole rotary switch 94 employed in the embodiment of the invention illustrated in Figure 6. Again, there are at least as many positions as there are sets of X—Y stores.

The output of the amplifier 100 is impressed upon the proper contact 264 of a fourth pole 272 of the sampler switch 180 and thence to a lamp 101, which may be a neon bulb. The glowing or flickering of the lamp 101 indicates to the operator that the stores with which it is associated are busy at that moment.

If, as is possible, the radar fails to track, or loses, the target, the lamp 101 no longer lights. The observer then applies a direct-current voltage to the anodes of the X—Y stores 31 and 37 through contacts 103 of a four-pole, three-position manual switch 104, thereby removing from the monitor display tube 92 the target indication associated with that set of stores.

Thus, when a new target appears, the observer is aware that the X—Y stores 31 and 37 are available since the lamp 101 is unlighted and the manual switch 104 is in the "fixed voltage" position C (connected to the "fixed voltage" contacts 103). To insert the coordinate analog voltages for the new target in the X—Y stores 31 and 37, the observer simply throws the manual switch 104 to the "store" position A and depresses the push-button switch 320, thereby connecting the coordinate resolver 93 to the X—Y stores 31 and 37 through the "store" contacts 102. When the proper voltages have been inserted, the operator releases the push-button 320 and moves the switch 104 to its "neutral" position B.

Of course, there is a lamp, a manual switch, coincidence circuit and rectifier-filter circuit for each set of stores.

Referring to Figure 7, the input signals from the pulse former 13 and the X—Y comparator 21 are impressed upon input resistors 125 and 126 in the coincidence circuit 98. The values of these resistors 125 and 126 are small compared with that of the series resistor 127 so that the appearance of a pulse across only one input resistor, for example 125, results in a rather small output, due to the fact that the other resistor 126 and its associated rectifier 131 constitute a low impedance parallel path.

If the input pulses occur simultaneously, however, a relatively large output pulse is obtained. The output pulse is then rectified and filtered by means of a rectifier 128 and a resistor-capacitor filter network 129—130, the rectified and filtered output being applied to the lamp 101 through the sampler 94 and the amplifier 100 (Figure 6).

What is claimed is:

1. In a display system, in combination, a first display device responsive to applied voltages for displaying indications; a second display device responsive to applied voltages for displaying indications; means for producing voltages indicative of the position on one of said display devices of at least some of the indications thereon; means coupled to said other display device and responsive to said produced voltages for placing indications on said other display device in the same relative positions as said some indications on said one display device; and means operatively associated with said two display devices for distinguishing the indications on one device duplicated on the other from those on said one device not duplicated on the other.

2. In a display system, in combination, a first display device responsive to applied voltages for displaying indications; a second display device responsive to applied voltages for displaying indications; means operatively associated with two display devices for producing a combined indication of the indications on said two devices, with indications in the same relative positions on the two devices superimposed; means for producing voltages indicative of the position on one of said display devices of at least some of the indications thereon; means coupled to said other display device and responsive to said produced voltages for placing indications on said other display device in the same relative positions on said other display device as said some indications on said one display device; and means operatively associated with said two devices for distinguishing a combined indication of superimposed indications from a combined indication of non-superimposed indications.

3. In a display system, in combination, a first display device responsive to applied voltages for displaying indications; a second display device responsive to applied voltages for displaying indications; means operatively associated with two display devices for producing a combined indication of the indications on said two devices, with indications in the same relative positions on the two devices superimposed; means for producing voltages indicative of the position on one of said display devices of at least one of the indications thereon; means coupled to said other display device and responsive to said produced voltage for placing an indication on said other display device in a position corresponding to the position of said indication on said one display device; and means operatively associated with said two devices for distinguishing a combined indication of superimposed indications from a combined indication of non-superimposed indications.

4. In a display system as set forth in claim 3, said two display devices comprising cathode ray tube indicators having screens of the same size and shape.

5. In a radar system, in combination, a first circuit for detecting signals corresponding to all objects within the range of said system; display means coupled to said circuit for displaying said signals in positions corresponding to the positions in space of said objects; means for deriving from some of said signals analog voltages indicative of the positions in space of said objects; storage means coupled to said last-named means for individually storing said analog voltages; and display means coupled to said storage means for displaying the stored voltages in positions corresponding to the positions in space of the objects to which said stored voltages correspond.

6. In a radar system, in combination, a first circuit for detecting signals corresponding to all objects within the range of said system; cathode ray tube display means coupled to said circuit for displaying said signals in positions corresponding to the positions in space of said objects; means for deriving from some of said signals analog voltages indicative of the positions in space of said objects; storage means coupled to said last-named means for individually storing said analog voltages; and cathode ray tube display means coupled to said storage means for displaying the stored voltages in positions corresponding to the positions in space of the objects to which said stored voltages correspond.

7. In a radar system, in combination, a first circuit for detecting signals corresponding to all objects within the range of said system; display means coupled to said circuit for displaying said signals in positions corresponding to the positions in space of said objects; means for deriving from at least some of said signals analog voltages indicative of the positions in space of said objects; a plurality of storage means coupled to said last-named means for individually storing said analog voltages; second display means coupled to said storage means for displaying the stored voltages in positions corresponding to the positions in space of the objects to which said stored voltages correspond; and means coupled to at least one of said storage means and to said second display means for generating at least one analog voltage indicative of a position in space and supplying the same to said one storage means, and simultaneously placing a signal on said second display means in a position indicative of said position in space.

8. In a radar system, in combination, a first circuit for detecting signals corresponding to all objects within the range of said system; display means coupled to said circuit for displaying said signals in positions corresponding to the positions in space of said objects; means for deriving from some of said signals analog voltages indicative of the positions in space of said objects; storage means coupled to said last-named means for individually storing said analog voltages; display means coupled to said storage means for displaying the stored voltages in positions corresponding to the positions in space of the objects to which said stored voltages correspond; and means operatively associated with said two display means for producing a combined display of the signals on said two means with indications in the same relative positions on said two display means superimposed.

9. In a radar system, in combination, a first circuit for detecting signals corresponding to all objects within the range of said system; display means coupled to said circuit for displaying said signals in positions corresponding to the positions in space of said objects; means for deriving from some of said signals analog voltages indicative of the positions in space of said objects; a plurality of storage means coupled to said last-named means for individually storing said analog voltages; second display means coupled to said storage means for displaying the stored voltages in positions corresponding to the positions in space of the objects to which said stored voltages correspond; means coupled to at least one of said storage means and to said second display means for generating at least one analog voltage indicative of a position in space and supplying the same to said one storage means, and simultaneously placing a signal on said second display means in a position indicative of said position in space; and means operatively associated with said two display means for distinguishing the signals which are in the same relative positions on said two means from those not in the same relative positions on said two means.

10. In a radar system including means for receiving signals from objects within range of the system, first display means for displaying said signals in positions corresponding to the positions in space of said objects, means for deriving from said signals analog voltages indicative of the positions in space of the objects from which the signals are received, and storage means for individually storing voltages derived from at least one of said signals, in combination, second display means responsive to voltages for displaying signals in positions corresponding to the positions in space to which said voltages correspond; and voltage generator means coupled to at least one of said storage means and to said second display means for generating at least one analog voltage indicative of a position in space and supplying the same to said one storage means, and simultaneously placing a signal on said second display means in a position indicative of said position in space.

11. In a radar system as set forth in claim 10, further including means operatively associated with said two display means for distinguishing the signals on the first and second means which are in the same relative positions on said two means from those not in the same relative positions on said two means.

12. In a radar system as set forth in claim 11, said two display means comprising cathode ray tube indicators.

13. In a radar system including circuit means for receiving signals from objects within the range of said system, means for deriving from at least some of said signals analog voltages indicative of the positions in space of the objects from which the signals are received, storage means for storing the analog voltages derived from one of said signals, and means responsive to a stored analog voltage and to said signals for periodically correcting that voltage as the object from which the voltage is derived moves in space, an arrangement for selecting for storage in said storage means the analog voltages indicative of a particular object comprising, in combination, first means receptive of said signals for producing visual indicia thereof in positions corresponding to the positions in space of the objects from which they are received; second means receptive of a generated voltage for producing a visual indicium thereof; voltage generating means coupled to said storage means and to said second means for producing a visual indicium on said second means in a position corresponding to that of a position in space and simultaneously inserting in said storage means an analog voltage indicative of said position in space; and means for viewing the visual indicia on said first means and the visual indicium on said second means in superimposed relation.

14. A radar system including circuit means for receiving signals from objects within the range of said system; means for deriving from at least some of said signals analog voltages indicative of the positions in space of the objects from which the signals are received; storage means for individually storing the analog voltages derived from at least some of said signals; means responsive to a stored analog voltage and to said signals for periodically correcting that voltage as the object from which the voltage is derived moves in space; first means receptive of said signals for producing visual indicia thereof in positions corresponding to the positions in space of the objects from which they are received; second means coupled to said storage means for producing visual indicia in positions corresponding to the positions in space of the objects to which the stored analog voltages correspond; and means for distinguishing the visual indicia on said first and second means which are in the same relative positions on said two means from those not in the same relative positions on said two means.

15. In a radar system including means for transmitting pulses to objects in a predetermined area and for receiving echoes from said objects, in combination, first display means for displaying said echoes in positions corresponding to the positions in space of the objects from which the echoes are received; second display means responsive to a generated voltage for producing indications; selection means for generating a voltage and applying the same to said second display means for producing an indication on said second display means in the same relative position as a given echo on said first display means; and means operatively associated with said two display means for producing a combined indication of said two display means with indications of one superimposed on corresponding indications of the other.

16. Apparatus in accordance with claim 15, wherein said display means comprise cathode ray tube indicators, and said means for producing a combined indication comprises a dichroic mirror arranged to reflect light from the screen of one of the indicators and to transmit light from the screen of the other indicator.

17. In a display system, in combination, a first display device responsive to applied voltages for displaying first indications, a second display device responsive to applied voltages for displaying second indications, optical means operatively associated with said display devices for characteristically differentiating said first indications from said second indications and for superposing said differentiated second indications on correspondingly located, differentiated first indications, means for generating voltages indicative of the positions of indications on said first display device, and utilization means coupled to said second display device and responsive to said generated voltages for producing indications on said second display device.

18. Apparatus in accordance with claim 17, wherein said display devices comprise cathode-ray display tubes and said optical means comprises a dichroic mirror.

19. In a radar system including means for transmitting pulses to targets in an area, means for receiving echo pulses reflected from said targets and first indicating means for displaying said echoes, in combination, means for deriving from at least one of said received echoes a given pair of coordinate voltages indicative of the position in space relative to said transmitting means of the target from which said one echo is reflected; a plurality of pairs of storage circuits, each said pair including one storage circuit for storing one coordinate voltage of a pair of said voltages and another storage circuit for storing the other coordinate voltage of said pair of coordinate voltages; second indicating means including means for producing a simulated echo thereon and deflection means responsive to a pair of coordinate voltages for adjusting the position on said second indicating means of said simulated echo to correspond to the position on said first indicating means of an echo from which is derived a pair of coordinate voltages of the same value; adjustable circuit means for producing a pair of coordinate voltages indicative of the position in space of any target; switch means for connecting said adjustable circuit means to said second indicating means for deflecting the simulated echo thereon in accordance with the coordinate voltages produced by said adjustable circuit means, and for connecting said adjustable circuit means to a selected pair of said storage circuits so as to charge said selected pair of said storage circuits to a pair of coordinate voltages produced by said adjustable circuit means; means for adjusting said circuit means to produce a pair of coordinate voltages of the same amplitude as said given pair of coordinate voltages, whereby said simulated echo is moved to a position on said second indicating means corresponding to the position of said one echo on said first indicating means; and comparison means connected intermediate said selected pair of storage circuits and said means for deriving from said one received echo a pair of coordinate voltages for comparing the voltage stored in said pair of selected storage circuits and said given pair of coordinate voltages and when they are within a predetermined range with respect to each other for changing the voltage stored in said selected pair of storage circuits in accordance with any changes in said given pair of coordinate voltages.

20. In a radar system as set forth in claim 19, further including means for superimposing the display on said first indicating means on the display on said second indicating means with echoes on one superimposed on corresponding echoes on the other including means for distinguishing superimposed indications from non-superimposed indications.

21. In a radar system as set forth in claim 19, each said indicating means including a screen and said two screens being perpendicularly disposed with respect to one another, and further including a dichroic element positioned at an angle of 45° with each screen for permitting light from one said screen to pass through said element and light from the other said screen to be reflected from said element, said screens being positioned relative to one another so that images in corresponding places on said screens are superimposed.

22. Apparatus in accordance with claim 20, wherein said adjustable circuit means comprises a joystick mechanism comprising a lever coupled to two orthogonally disposed shafts and movable in two orthogonal planes, a separate potentiometer associated with each shaft, each of said potentiometers having its contact arm coupled to the shaft with which said potentiometer is associated, a direct-current signal source coupled to each of said potentiometers, and means for deriving a direct-current signal from each of said potentiometers in accordance with the position of said lever.

23. Apparatus in accordance with claim 20, wherein said adjustable circuit means comprises a joystick mechanism comprising a lever coupled to two orthogonally disposed shafts and movable in two orthogonal planes, a separate synchro associated with each of said shafts, and means for deriving a direct-current signal from each synchro in accordance with the position of said lever.

24. In a radar system as set forth in claim 19, further including a plurality of indicating devices, one operatively associated with each pair of storage circuits, for indicating when each pair of storage circuits has a pair of charges corresponding to a pair of coordinate voltages stored therein.

25. In a radar set as set forth in claim 24, said indicating devices including indicating lights, one light being associated with each pair of storage circuits.

26. In a radar having means for transmitting pulses to targets in an area, means for receiving echo signals reflected from said targets, means for deriving from said received echoes sets of first electrical analog signals indicative of the spatial position of the targets from which said echoes are reflected, said sets of analog signals being periodically derived anew for each target from which echo signals are being received, means for storing at least one of said sets of analog signals, and means for correcting each stored set of analog signals in accordance with the newly derived analog signals for the target from which the stored analog signals were previously derived, means for indicating targets whose analog signals are not being stored comprising, in combination, a radar display device coupled to said receiving means for displaying said echo signals, a resolving means for producing sets of second signals indicative of the spatial position of a target corresponding to any echo displayed on said first display means, a monitor display device coupled to said resolving means for displaying said sets of second signals, and dichroic means operatively associated with said display device for transmitted light of one color and reflected light of a different color, said dichroic means being optically arranged to transmit the indication from one device, reflect the indications from the other device and superimposed said reflected and transmitted indications to form a combined indication.

27. In a radar having means for transmitting pulses to targets in an area, means for receiving echoes from said targets and displaying them on an echo indicating device, and sets of circuit means for periodically deriving and storing sets of first electrical analog signals indicative of the spatial positions of selected targets whose echoes are being received, means for visually indicating those targets whose analog signals are being stored, comprising, in combination resolving means for producing from said displayed echoes sets of second electrical analog signals indicative of the spatial positions of the targets from which said displayed echoes are reflected, monitor display means for displaying said sets of second analog signals, and optical means for producing a combined indication of said echo and monitor displays wherein corresponding indications are superimposed and wherein said combined indications are optically differentiated from said other indications.

References Cited in the file of this patent

UNITED STATES PATENTS

| | | |
|---|---|---|
| 2,419,239 | White | Apr. 22, 1947 |
| 2,548,900 | Lester | Apr. 17, 1951 |
| 2,597,636 | Hall | May 20, 1952 |